April 12, 1927.
H. A. WAYRINGER
1,624,699
SILICA RECEPTACLE AND PROCESS OF MANUFACTURE
Filed Nov. 3, 1926
Fig. 1.
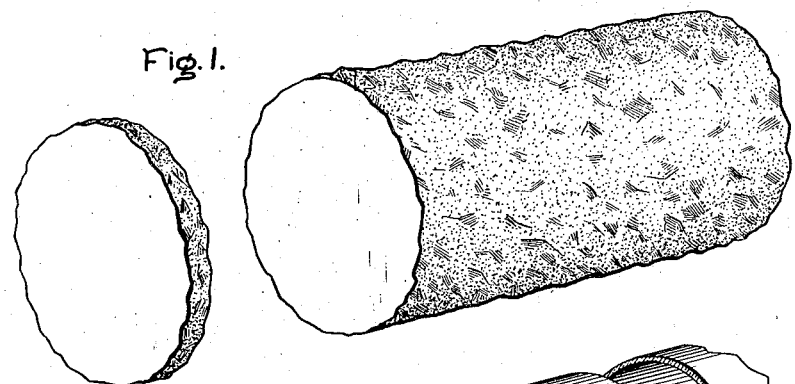
Fig. 2.
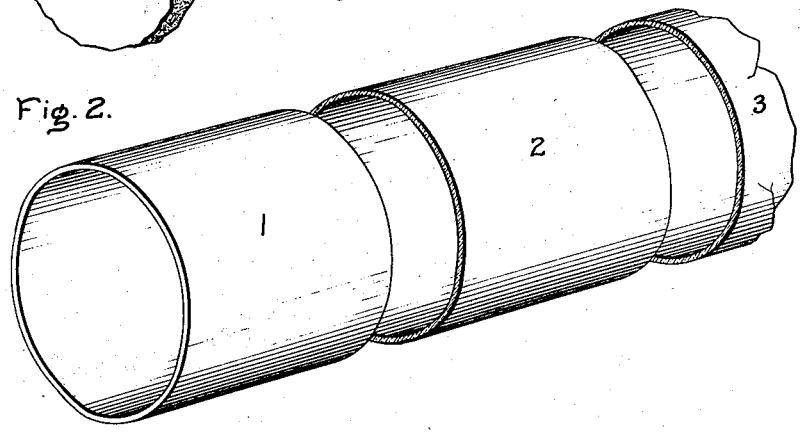
Fig. 3.
Fig. 4.
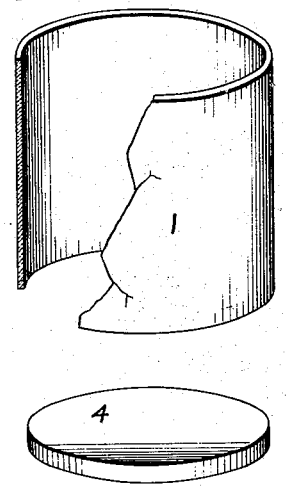
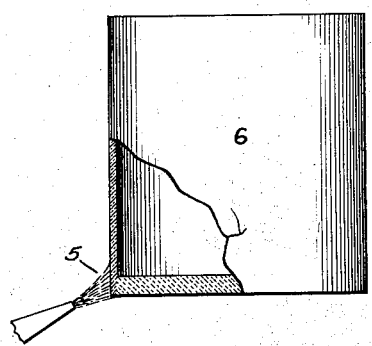
Inventor:
Henry A. Wayringer Patented Apr. 12, 1927.

1,624,699

UNITED STATES PATENT OFFICE.

HENRY A. WAYRINGER, OF SCHENECTADY, NEW YORK, ASSIGNOR TO GENERAL ELECTRIC COMPANY, A CORPORATION OF NEW YORK.

SILICA RECEPTACLE AND PROCESS OF MANUFACTURE.

Application filed November 3, 1926 Serial No. 146,059.

The present invention relates to silica receptacles, such as beakers, jars or cups, and it is the object of my invention to provide a structure adapted to be manufactured at low cost.

Heretofore, silica hollow ware has been made either by the laborious building up of the desired articles from small bits of silica or by moulding processes which are not applicable to large sized containers. Because of these comparatively costly methods of manufacture, the use of silica for the manufacture of utensils has been greatly restricted.

By the present invention I have provided both a new form of silica receptacle and a new method of fabricating silica receptacles which is adapted for quantity production by automatic machinery and thereby have provided an improved product having greater regularity and symmetry which may be manufactured at a lower cost than was possible heretofore.

In accordance with my invention elongated tubes of silica are mechanically subdivided into sections of suitable length, and discs of silica, preferably produced by mechanical subdivision from an ingot of silica, are welded to the tubes to form the bottom of the desired containers.

The accompanying drawing shows in perspective in Figs. 1 and 2 respectively a solid ingot and a tube of silica in the process of subdivision; Fig. 3 shows in perspective the parts prior to assembly and Fig. 4 is a side view partly in section of a completed article.

Long lengths of relatively large bore silica tube stock is first made in carrying out my invention by any suitable known method, for example, by drawing a tube from a plastic mass of silica. Tubes many feet in length may be made by this method. Large bore tubes also may be made by expanding small bore tubes of opaque or transparent silica until a desired diameter is obtained. This tube stock is trimmed and cut into suitable lengths as indicated at 1, 2 and 3 in Fig. 2. Methods for thus cutting silica are well known. Plates are similarly cut from a solid ingot of silica as indicated in Fig. 1, the thickness of the plates being appropriate for the bottom or base of the desired receptacle.

A silica plate or disc 4 is ground and fitted to the inner periphery of a cylinder 1, Fig. 3 and the parts then are united by welding in an arc or oxyhydrogen flame, as indicated at 5, producing a flat-bottom, square-cornered receptacle 6, Fig. 4. As silica has a negligibly low coefficient of thermal expansion, the article is not affected by the severe local heating of the parts during welding; neither does cracking occur during cooling at the junction of its flat and curved surfaces respectively of the bottom and sides of the receptacle.

In accordance with the provision of the patent statutes I have described the principle of operation of my invention together with the apparatus which I now consider to represent the best embodiment thereof but I would have it understood that the apparatus shown is only illustrative and that the invention may be carried out by other means.

What I claim as new and desire to secure by Letters Patent of the United States, is:

1. The method of making silica receptacles which consists in fusion sealing a disc of silica into the open end of a silica tube.

2. The method of fabricating silica containers which consists in mechanically subdividing a silica tube into sections, mechanically fitting a disc of silica to fit into the open end of said tube and heating the contiguous portions of said tube and disc to a sufficiently high temperature to weld said parts to one another.

3. A container consisting of silica and having rounded sidewalls and a substantially flat base joined to said sidewalls by a fusion weld.

In witness whereof, I have hereunto set my hand this 2nd day of November, 1926.

HENRY A. WAYRINGER.